No. 693,988. Patented Feb. 25, 1902.
E. W. TAYLOR.
TROLLEY FOR ELECTRIC CARS.
(Application filed Dec. 26, 1900.)
(No Model.) 4 Sheets—Sheet 1.
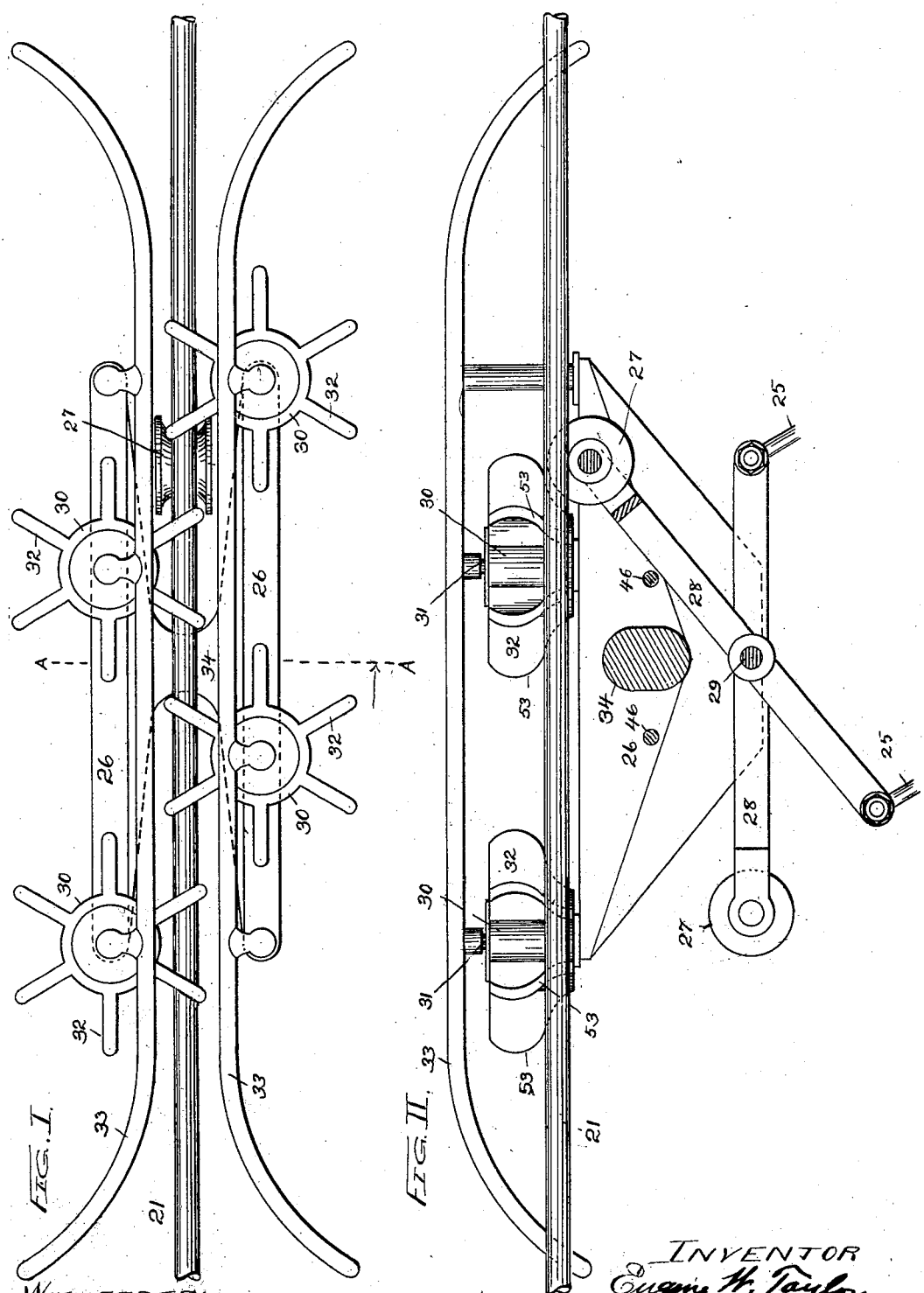

No. 693,988. Patented Feb. 25, 1902.
E. W. TAYLOR.
TROLLEY FOR ELECTRIC CARS.
(Application filed Dec. 26, 1900.)
(No Model.) 4 Sheets—Sheet 2.
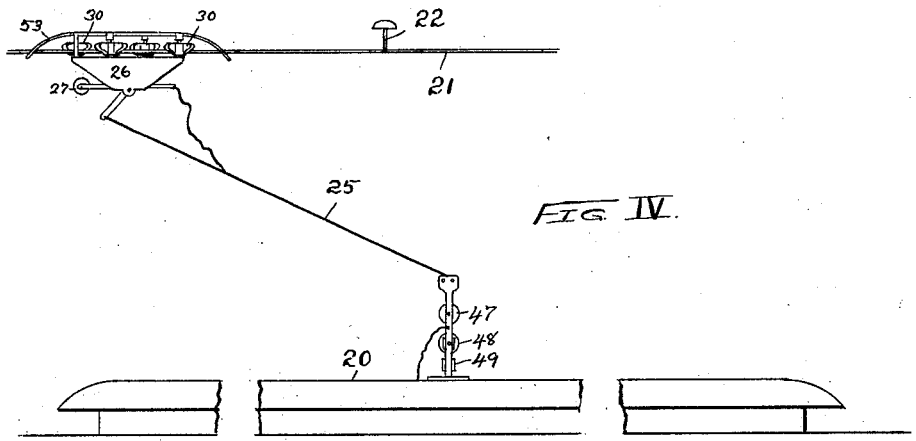
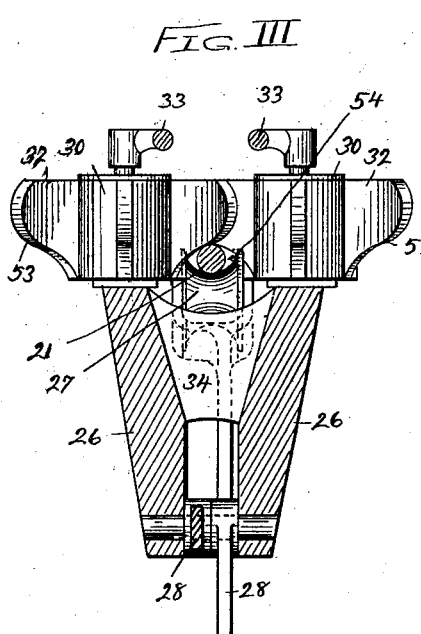
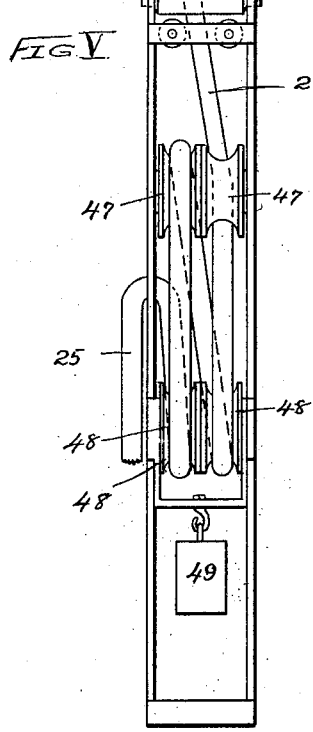
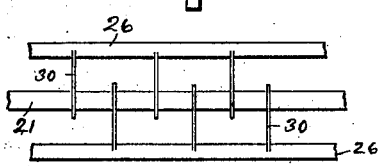
WITNESSES: INVENTOR:
Lew. C. Curtis Eugene W. Taylor,
H. W. Munday, BY Munday, Evarts & Adcock
HIS ATTORNEYS.

No. 693,988. Patented Feb. 25, 1902.
E. W. TAYLOR.
TROLLEY FOR ELECTRIC CARS.
(Application filed Dec. 26, 1900.)
(No Model.) 4 Sheets—Sheet 3.
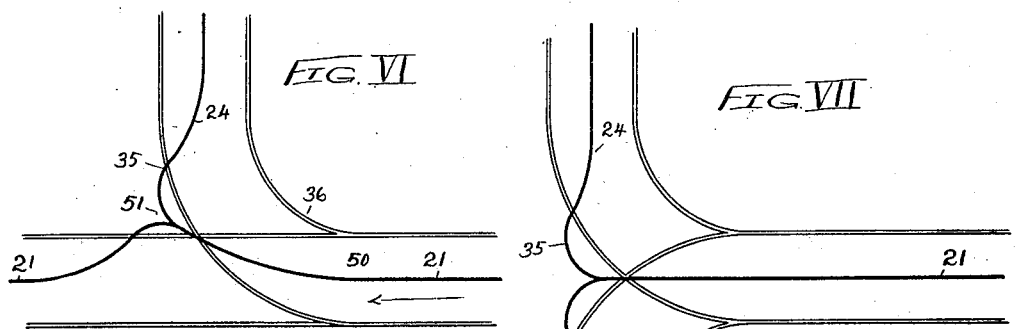
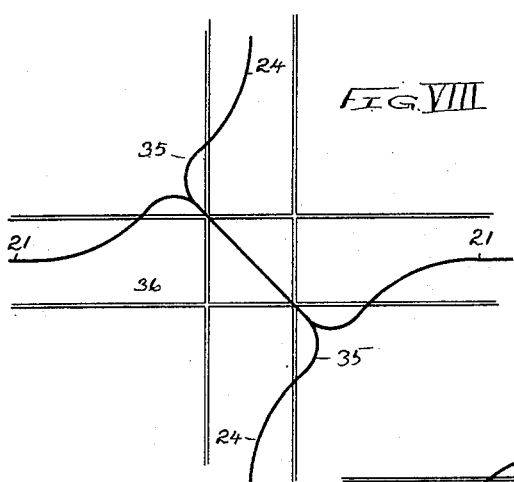
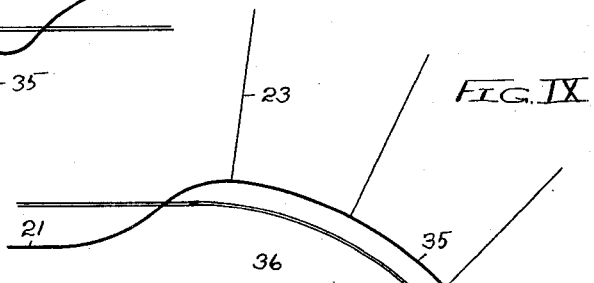
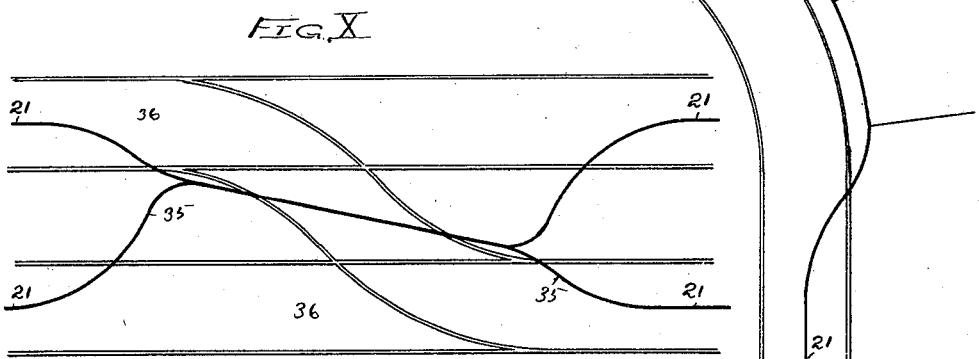
WITNESSES: INVENTOR:
Leo. E. Curtis Eugene W. Taylor
H. W. Munday BY Munday, Evarts & Adcock
HIS ATTORNEYS.

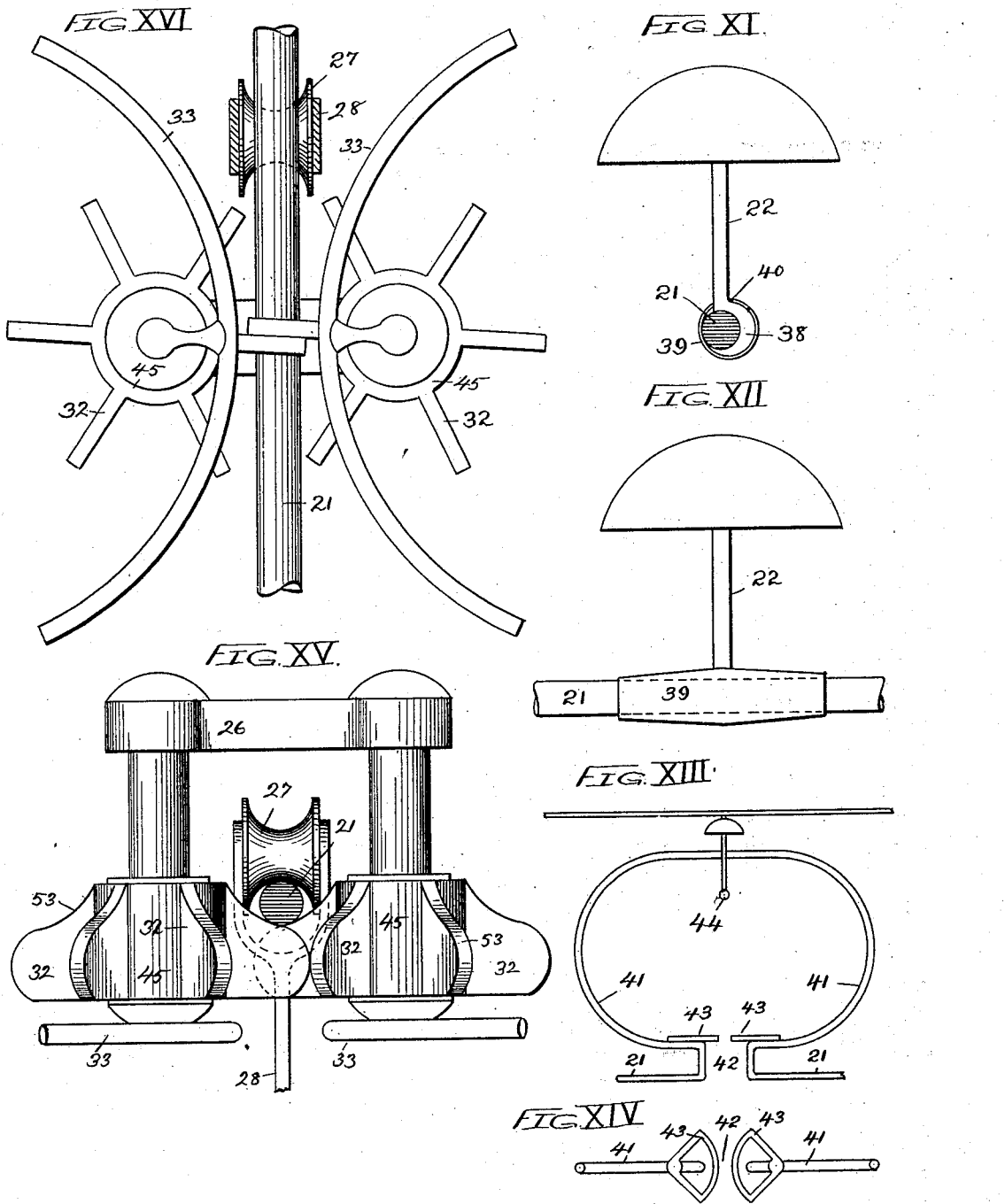

UNITED STATES PATENT OFFICE.

EUGENE W. TAYLOR, OF SPOKANE, WASHINGTON.

TROLLEY FOR ELECTRIC CARS.

SPECIFICATION forming part of Letters Patent No. 693,988, dated February 25, 1902.

Application filed December 26, 1900. Serial No. 41,040. (No model.)

*To all whom it may concern:*

Be it known that I, EUGENE W. TAYLOR, a citizen of the United States, residing in Spokane, in the county of Spokane and State of Washington, have invented a new and useful Improvement in Trolleys for Electric Cars or other Carriers, of which the following is a specification.

My invention relates to trolleys or rolling or sliding devices for taking current to the motor of an electric car or other vehicle from a wire or conductor above, below, or at the side of the track upon which the car runs.

Trolleys for electric cars heretofore in use have generally been supported on a trolley-pole mounted on the car and provided with a spring for forcing the trolley-wheel upward against and holding it in contact with the trolley-wire or electric conductor, the wheel or contacting surface or device of the trolley contacting with the wire or conductor at only one side thereof, usually the under side, the trolley-wheel being always held and rotating in a substantially vertical plane. In practical operation, especially when the car is in rapid motion or the track rough, the jolting or teetering motion of the car causes the trolley-wheel sometimes to lose the wire entirely, sometimes to travel along the wire with a kind of skipping contact therewith, producing great loss of energy and destruction or injury of parts by sparking, and to continually produce more or less variation of contact pressure between the trolley wheel and wire, resulting in increased and variable resistance, and in such trolley devices also at crossings and switches the car usually has to be stopped, as well as at terminals, and the conductor to get out and manipulate the trolley-pole to adjust the trolley from one wire to another or to cause it to follow the proper wire over the obstruction.

It is the object of my invention to provide a trolley for electric cars or other carriers by which these objections or difficulties and others heretofore experienced may be practically obviated or overcome, by which the trolley will automatically pass to or follow the proper wire or conductor at switches, curves, or crossings without the necessity of any hand manipulation, and which will at the same time be of a simple, efficient, and durable construction.

My invention consists in the means I employ to accomplish this important result— that is to say, it consists, essentially, in a trolley having contacting devices or surfaces on both sides of the wire or conductor. It consists in a trolley having both lower and upper contacting devices, between which the wire or conductor is embraced and upon which wire or conductor the trolley swings or turns laterally as a pivot in passing forks or branches of the wire or conductor at switches or horizontal guys at curves. The trolley-contacting devices on one side or the other of the conductor (either the upper side or lower side thereof, according as the supports for the wire or conductor extend above or below the same) and such supports for the wire or conductor are one or the other movable or yielding one in respect to the other to permit the trolley to pass the supports. In practice I ordinarily prefer not to use movable or yielding supports for the wire or conductor, but to employ stationary or fixed supports, as heretofore, and I therefore ordinarily make either the upper or the lower contacting devices of the trolley itself movable or yielding, such movable or yielding contact devices being preferably rotatable and in the form of small turnstiles, arranged astride the wire or conductor, one or more on the right and one or more on the left thereof. To facilitate or insure the proper passing of forks or branches of the conductor, horizontally-extending guys, and other obstructions, my laterally tilting or swinging trolley is furnished with shoes or curved guides to properly tilt and guide it under branches of the conductor or lateral guys at switches, curves, or crossings. In my invention the trolley-pole is dispensed with and the trolley is supported by the trolley-wire or conductor itself, upon which it rides, and is simply pulled along after the car by the flexible wire or conductor connection between the trolley and the car or its motor. In practice I prefer to make the upper contacting devices the movable or yielding ones in respect to the supports for the wire or conductor, and the lower contacting device, which bears against the under side of the wire or conductor, is preferably mounted on a lever or arm pivoted to the trolley-frame, so that the tension of the flexible connection between the trolley and the car produced by pulling the trolley along on the wire or conductor will serve to hold such lower contacting device with the proper pressure against the wire or conductor. The lower contacting device may preferably be in the form of an ordinary trolley wheel or roller, and I prefer to employ two of these lower contacting devices, their arms or levers having a common pivot, scissors fashion.

My invention also consists, in connection with my laterally swinging or swiveling trolley having upper and lower contacting devices, of a mutually coöperative system or arrangement of wire or conductor in respect to the track for the car, whereby the trolley at switches, curves, and crossings is automatically caused to properly select and follow the required wire or conductor or branch thereof, according to the track taken by the car itself. My invention also consists in the novel construction of parts and devices and combinations of parts and devices herein shown and described, and specified in the claims.

By my invention the trolley automatically accompanies the car or vehicle upon or along all the routes chosen by the operator without requiring attention on the part of the motorman or operator to adjust the trolley from one branch or wire to another. In my improved trolley it is impossible for the trolley to escape from the wires or conductors or get out of electrical contact or connection therewith, thus preventing all sparking and its deleterious effects, and my improved trolley will automatically pass all of the supports, guys, hangers, switches, and crossings along and upon the wires or conductors and their connections, and in my improved trolley also there is no liability at a railroad-crossing or other place of danger of the breaking of the electric current and consequent stopping of the car, which frequently takes place with the trolley devices now in use by reason of the trolley accidentally being thrown or jostled off the wire or conductor supplying the current.

My invention will be more fully understood by those skilled in the art by reference to the accompanying drawings, forming a part of this specification, and in which similar figures of reference indicate like parts throughout the drawings.

In said drawings, Figure I is a plan view of a trolley device embodying my invention. Fig. II is a central vertical longitudinal section. Fig. III is a cross-section on the line A A of Fig. I. Fig. IV is a side elevation showing the trolley in operation. Fig. V is a detail view of a take-up device for the flexible connection or cable extending from the trolley to the car. Figs. VI, VII, VIII, IX, and X are diagrammatic plan views showing the relative arrangement of tracks and trolley-wires or conductors at switches, crossings, and curves of different forms commonly used, Fig. VI illustrating the relative arrangement of tracks and trolley-wires where a branch track diverges to one side, Fig. VII where the tracks diverge to both sides, Fig. VIII where tracks using the same current cross, Fig. IX where the track curves, and Fig. X where a simple switch occurs from one parallel track to another. Figs. XI and XII are side and front elevations, respectively, of the trolley-wire support or hanger. Figs. XIII and XIV show a form of crossing employed where the trolley-wires of different companies or tracks supplied with different electric currents cross. Figs. XV and XVI are end and bottom views, respectively, showing a modification in which the supports for the wire or cable are made movable or yielding; and Fig. XVII is a plan view showing a further modification.

In said drawings, 20 represents a portion of an electric car or other vehicle. 21 is the wire or conductor by which the electric current is supplied, the same having supports or hangers 22 and horizontally-extending guys 23 at curves, as required, and also having at switches or crossings forks or branch wires 24.

25 is the flexible connection, consisting of a covered wire or cable extending from the trolley to the electric motor on the car or vehicle.

26 is the frame of my improved trolley. The trolley is provided with one or more, preferably two, lower contacting devices 27, each consisting, preferably, of a grooved roller or wheel and each preferably journaled on a movable arm or lever 28, pivoted to the trolley-frame 26 by a pivot 29, which is common to the two arms or levers 28. To the lower extremities of these arms or levers the flexible connection 25 is attached, so that the tension of the flexible connection in pulling the trolley along after the car or vehicle will hold one or both of the lower contacting devices 27 always against the under side of the trolley-wire or conductor 21.

The trolley is also provided with two or more, preferably four, upper movable or yielding contacting devices 30, which bear against the upper side of the trolley-wire or conductor 21 and which are adapted to move or yield out of the way of the supports or hangers 22 of the trolley-wire or conductor 21 as the trolley passes the same. These movable or yielding contacting devices 30 may be of any suitable form or construction adapted to contact with the conductor and yield or move out of the way of the conductor-supports as the trolley passes. Each, however, as illustrated in the drawings, is preferably of a small turnstile form and rotatable on vertical pins or pivots 31 on the trolley-frame 26. Each of the radial arms or wings 32 of the movable contacting devices or turnstiles 30 is preferably given a curved lower edge 53, substantially as illustrated in the drawings, to engage with the trolley-wire or conductor 21. The movable or rotatable contacting devices or turnstiles 30 are preferably arranged alternately of each other, as illustrated in Fig. I, instead of opposite each other, on the right or left sides of the trolley-wire or conductor, and they are also preferably arranged alternately in respect to the lower contacting devices 27 27, as indicated in Fig. I, so that all of the contacting devices will bear against the trolley-wire or conductor at different points. As the trolley has simply a flexible connection with the car and as the trolley rides freely upon the trolley-wire or conductor, being supported therefrom by the upper movable or yielding contacting devices which rest thereon, the trolley as a whole is free to turn laterally or swing from side to side on the trolley-wire or conductor as a pivot, and by properly locating or arranging the trolley-wire at curves, crossings, or switches in proper coöperative relation to the track upon which the car runs the flexible connection connecting the trolley to the car and by which the trolley is pulled along after the car will serve itself to automatically swing, turn, or tilt the trolley more or less onto its side, so as to cause the same to follow after the car on the proper fork or branch of the trolley-wire or conductor, and thus also enable the trolley to properly pass the other fork or branch of the conductor. This laterally swinging or tilting movement of the trolley on the trolley-wire or conductor as a pivot also enables the trolley to automatically properly pass horizontally-extending guys at curves or other portions of the track. To facilitate and insure the proper guiding and tilting of the trolley under forks of the conductor or lateral guys or other obstacles, the trolley is provided with a pair of shoes or curved guides 33 33, which are secured to the upright pins, pivots, or shafts 31, upon which the turnstiles turn, these shoes or guides being preferably just flush with the upper ends of said pins, pivots, or shafts. The shoes or guides 33 or the parallel portions of the same are located inside the pivots or shafts 31 of the turnstiles, and the ends of these shoes or guides are curved or inclined both downwardly and outwardly, as will be readily understood from Figs. I and II, so that when the trolley tilts sidewise to pass a horizontal conductor fork or branch or guy one of these guides will pass under and the other over such fork or guy, thus allowing the fork or guy to pass between the guides, so to speak. The curved or inclined lower edges 53 of the turnstile wings, arms, or vanes 32 facilitates the turning of the turnstiles in passing a horizontal fork or guy. The two lower contact devices or trolley-wheels 27 and their movable arms or levers work up and down between the two parallel sides of the trolley-frame 26, said sides being united together by a central cross bar or connection 34. The upper movable contacting devices or turnstiles 30 have their axes or shafts located sufficiently far apart laterally to give free space for the passage between them of the vertical supports of the trolley-wire or conductor and for horizontally-extending forks or branches thereof or horizontally-extending guys as the turnstiles rotate, while at the same time the turnstiles are close enough together so that one or more of their radial arms, wings, or vanes always extend over and rest upon the trolley-wire or conductor. It is thus absolutely impossible for the trolley to escape from the wire or conductor, as the latter is at all times surrounded by the upper movable contacting devices or turnstiles on the upper side thereof and by the trolley-frame and lower contacting devices on the under side thereof. The flexible connection 25, extending from the trolley to the car or motor, is divided into two branches near its upper end, one branch thereof connecting with each of the trolley-wheel arms 28. To cause the trolley device to be turned or tilted to one side at a curve, switch, or crossing of the track by the tension of the flexible connection 25, that pulls the trolley along after the car, so as to pass horizontally-extending forks, branches, or guys, the trolley-wire is provided with a portion 35, arranged eccentric to the center of the track 36 or outside the track, thus giving a side pull to the trolley as the car passes along. By this simple coöperative arrangement, relation, or combination of the trolley-wire and track at switches, curves, or crossings the laterally swinging or swiveling trolley is caused to be automatically tilted or turned on the trolley-wire or conductor as a pivot, as required, in passing horizontal guys or branches of the conductor.

In the drawings I have for convenience illustrated my invention as constructed and applied to overhead trolley-wires or conductors; but of course it will be understood by those skilled in the art that it may be used in connection with wires or conductors located at the side of the car or track or beneath the same.

As in my invention the trolley-pole is dispensed with and the trolley is supported on or by the trolley-wire or conductor itself, I prefer to employ vertical supports or hangers 22 for the trolley-wire or conductor provided with hooks 38, extending partially around the conductor and furnished with a sheet-metal holder 39, having an eye 40, through which the hanger-hook passes and which is folded or bent around the trolley-wire to form an extended bearing or holder therefor.

Where two tracks belonging to different companies or supplied with different currents cross each other, I provide one of the crossing wires, as 21, with a loop 41, having an opening 42 at its bottom furnished with curved guides 43 43 on each side of said opening, the loop being large enough for the trolley to pass through when traveling on the crossing wire 44. The opening 42 at the bottom of the loop is sufficiently narrow so that if the trolley is provided with four turnstiles, as illustrated in the drawings, three of the turnstiles may be in contact with the wire 21 while the remaining one is crossing the gap or opening 42.

In the modification illustrated in Figs. XV and XVI instead of employing fixed or stationary supports or hangers for the trolley-wire, conductor, or other cable I provide the same with movable or yielding supports 45, the same being preferably of the same construction and operation as the yielding or movable contacting devices or turnstiles 30, before described. In this modification the turnstiles are represented as being arranged opposite each other, so that their radial arms, wings, or vanes cross or interlock with each other as they revolve.

In Fig. XVII, I have illustrated a modified construction of the movable or yielding contacting devices in which a series of pivoted or spring arms adapted to be moved out of the way and returned to position one after another as the trolley passes a vertical hanger are mounted on each side of the trolley-frame. In this modification the movable or yielding contacting devices are not rotary.

The rotary turnstiles 30 may, if desired, be provided with ball-bearings or other devices for lessening friction. The arms or vanes 32 of the turnstiles extend beyond and across the longitudinal central line of the trolley, where the trolley-wire or conductor 21 passes. These vanes or arms 32 by reason of their curved or inclined edges 53 are longer at the top than at the bottom, and they are so located in respect to each other on each turnstile that one or more of them will always rest upon the trolley-wire, and thus support the trolley. A greater or less number of these turnstiles may be used on each trolley, according to varying conditions or requirements. The oscillation of the lower contacting devices or trolley-wheels 27 is limited by stops 46, against which the arms or levers 28 engage. The frame 26 may be made of any suitable construction. In the drawings I have illustrated one good form. The flexible connection 25 between the trolley and the car is preferably made automatically extensible to suit varying conditions in the travel of the car. This is preferably done by passing it through a system of pulleys 47, one of the pulleys 48 having a movable block furnished with a spring or weight 49 to extend the same.

The operation is as follows: In my invention instead of the trolley device being pressed upward against the trolley-wire, as in the ordinary construction heretofore in use, my trolley is hung or suspended upon the trolley-wire and rests upon and is supported by said wire, the vanes of each turnstile extending beyond the center line between the shafts of the turnstiles, as shown in Fig. I, so that whatever the position of any of said turnstiles at any time the trolley-wire will support the trolley and leave it at the same time free to swing or turn laterally on the trolley-wire as a pivot. The frame 26 of the trolley being rigid, the levers 28 28, carrying the trolley-wheels 27 27 underneath the trolley-wire, and the flexible connections 25 25 being attached to the lower extremities of the arms 28 28, carrying said trolley-wheels 27 27, when a pull is exerted upon either strand of said conducting-wires it will force one or both of said trolley-wheels 27 against the under side of the trolley-wire. An electrical contact is secured both from each of the movable or yielding contact devices or turnstiles 30 employed and from each of the trolley-wheels 27 pressing upon the lower side of the trolley-wire, thus assuring at all times several independent contacts and avoiding at all times deleterious effect of sparking. When the car starts to move in either direction, it is obvious that the trolley is pulled along by means of the flexible connection or connecting-wire 25 leading to said car. If the direction is to the right of the position in Fig II, the principal pull upon the trolley will be upon the left lower arm 28 and will force the right trolley-wheel 27 against the wire. When the trolley device reaches a vertical hanger or support 22 for the trolley-wire, said vertical hanger engages successively the projecting arms, wings, or vanes of the first turnstile 30, and said turnstile automatically revolves a slight distance, allowing the trolley to pass the said hanger without tending to release the trolley from its permanent position upon the trolley-wire. The same result successively occurs at each of the turnstiles 30, and thus the device automatically passes such obstructions without any possibility of being detached from the trolley-wire. Where a simple switch is encountered, the trolley-wire 21 is arranged as in Fig. VI, departing from its normal position over the center of the track, preferably bisecting the angle of divergence of the rails where the rails intersect and returning therefrom to the normal position between and over the tracks, as shown, and the operation of the trolley device is as follows at such points: As the car, traveling in the direction indicated by the arrow, as shown in Fig. VI, reaches the point 50, if the operator of the car chooses the track to the right it is plain that the motion of the car in that direction pulls the trolley off to the left of the track taken until at a point 51 it reaches the place where the trolley-wire forks, one branch or strand going to the left and the other to the right. At this point, the pull being to the right, the trolley is tilted a little upon its side, so that the branch or strand of the trolley-wire which it is desired to pass (in order to cause the trolley to remain upon the proper strand to the right) presents itself between the guides 33 33, hereinbefore described, causing the trolley device to tip still farther until it is practically upon its side, thus allowing the left-hand strand of the trolley-wire to pass each of the turnstiles in the same manner as hereinbefore described. Figs. VI, VII, IX, and X all show modifications of the same operation just described, and it is obvious that each of the difficulties in question is automatically and successfully met and solved by my trolley.

Figs. VIII and XIII show two methods of effecting a crossing where two tracks cross at right angles, or nearly so. The first method, as shown in Fig. VIII, employs the same methods as hereinbefore explained for a simple switch and needs no further explanation and would be the best method to employ where the two lines in question are charged by the same current of electricity. Fig. XIII illustrates a method which can be employed where two crossing lines are under different ownership or where the two currents employed are of different electromotive force. In said Fig. XIII the trolley-wire 21 is below and at right angles to the trolley-wire 44, carrying the current for the cross-line. The trolley-wire 21 is arranged with a loop surrounding said trolley-wire 44 in the form shown, and it is obvious that the device in question will pass or jump over the space 42 at the bottom of the said loop without difficulty, as, supposing four turnstiles to be employed, as shown in Fig. I, three at least of said turnstiles will rest upon the trolley-wire at any given time. Where a car upon the crossing line and operating upon the trolley-wire 44 comes to the crossing, it is obvious that the flexible connection or contacting wire 25 will readily pass through the opening or gap 42 between the lower ends of the loop of the trolley-wire 21, as said connecting or conducting wire is held taut by the take-up pulley device 47, herein described, and is guided through the opening in the loop by the converging guides 43, with which the sides of the loop of the trolley-wire 21 are provided.

It will be seen from the foregoing explanation of various requirements and conditions in the operation of said electric trolley herein described that where turns and switches are encountered in the trolley-wire the portion of the trolley-wire which is being passed at certain times assumes a shape varying in greater or lesser degree from that of a straight and continuous line, being sometimes curved and sometimes angular. It is therefore made necessary that the construction of the trolley should preferably be of such a character, as shown in the drawings, that a considerable clearance-space 54 is provided between the lower ends of the vanes of the turnstiles which rest upon the trolley-wire and the bearing-surfaces of the trolley wheel or wheels, as shown in Fig. III. At the same time it is desirable at all times that there should be a sufficient number of points of contact for said turnstiles and trolley wheel or wheels so that a good electrical contact is always maintained. In the arrangement shown in the drawings this end is further attained by the movability of the trolley-wheels 27, as shown in Fig. II, the arrangement being such that the pull on either or both arms 28, carrying said trolley-wheels, always tends to draw said trolley-wheels upward against said trolley-wire and, in addition to gravity, to draw said turnstiles downward against said trolley-wire, and at the same time, however, the clearance-space which results between the upper and lower contacting surfaces 30 and 27 is of a yielding, elastic, and pliant nature, so that the passing of the obstacles, whether in the way of protuberances on the wire where hangers or switches are fastened to the same or where curves or angles are met, may be easily effected, and this clearance-space will naturally and automatically widen and narrow, and thus accommodate itself to these varying conditions as they present themselves. In other words, the tension of the flexible connection 25 in pulling the trolley along the wire 21, acting upon the movable arms 28 of the trolley-wheels 27, tends to cause the trolley-wire to be yieldingly grasped or gripped, as it were, between the upper and lower contacting devices 30 and 27 of the trolley.

It is evident that the arrangement of elements here shown in the drawings is provided with special reference to the meeting and solution of the more complicated problems of electrical-car transmission and that a much more simple arrangement of elements can be employed successfully where none of these conditions of curves, angles, switches, and crossings exist or are not so complicated. Thus in a line where there are no switchings or crossings it would be sufficient for a simple pair of interlocking turnstiles with rigid frame underneath to be employed which would operate successfully under such conditions. Likewise under such conditions turnstiles could be employed with one or more trolley-wheels beneath, which latter could be either fixed or movable, or under such conditions the trolley-wire itself could be suspended by means of turnstiles used as hangers set underneath the trolley-wire at proper intervals along the line, as shown in Figs. XV and XVI, it being necessary, however, that the shafts upon which the turnstiles revolve should extend upward and be connected at a point sufficiently high above the trolley-wire as to permit the passage underneath this connecting rod or rods of a trolley-wheel running on top of the trolley-wire, as shown in Fig. XIV, and the conducting-wire leading from the trolley-wheel to the motor on the car will encounter underneath the trolley-wire the vanes of the turnstiles and will pass them in the same manner that the turnstiles themselves when moving along a trolley-wire will pass a hanger or switch. It is also evident that the turnstile arrangement here shown can be employed effectively as a fixed means for the arranging of the suspension of the trolley-wire itself, affording a means of clearance for a simple trolley wheel, roller, or brush to pass in traveling along said trolley-wire. It is further evident that the system of turnstile clearance here shown could be successfully employed in the construction of rope cable or wire tramways in the same manner, whether the same were operated by electricity, gravity, or any other power.

It will be observed that my trolley surrounds on all sides and at all times the trolley-wire and is threaded upon it like a needle upon a thread, so that it cannot escape from the wire, while at the same time it is provided with means for permitting it to pass vertical hangers or horizontal forks or guys on or connected to the trolley-wire.

I claim—

1. The electric trolley car or vehicle system herein described, comprising a track, a trolley-wire or conductor, and a trolley riding on said wire or conductor and adapted to swing or turn laterally thereon as a pivot, and having movable or yielding contacting devices having unyielding axes to pass the vertical supports or hangers of the conductor, said trolley-wire having at curves, switches or crossings a portion eccentric to or outside of the track upon which the car runs to cause said trolley to tilt or turn to one side to pass horizontally-extending guys or forks of the conductor, substantially as specified.

2. The electric trolley car or vehicle system herein described, comprising a track, a trolley-wire or conductor, and a trolley riding on said wire or conductor and adapted to swing or turn laterally thereon as a pivot, and having movable or yielding contacting devices to pass the vertical supports or hangers of the conductor, said trolley-wire having at curves, switches or crossings a portion eccentric to or outside of the track upon which the car runs to cause said trolley to tilt or turn to one side to pass horizontally-extending guys or forks of the conductor, and said trolley having a flexible connection with the car, substantially as specified.

3. A trolley having upper and lower contacting devices embracing or surrounding the trolley-wire or conductor, the upper contacting devices being movable or yielding having unyielding axes to permit the trolley to pass the hangers or supports for the trolley wire or conductor, substantially as specified.

4. A trolley provided with movable or yielding contacting devices having unyielding axes to pass hangers or supports for the trolley-wire, substantially as specified.

5. A laterally swinging or turning trolley having mounted on unyielding axes movable or yielding contacting devices to pass vertical hangers or supports and horizontal forks or guys connected to the trolley wire or conductor, substantially as specified.

6. A trolley surrounding and threaded upon a trolley-wire or conductor and provided with means for permitting the trolley to pass hangers, forks, guys or obstructions on or connected to the trolley-wire or conductor, said means comprising a plurality of movable or yielding contacting devices having unyielding axes, substantially as specified.

7. A trolley surrounding and threaded upon a trolley-wire or conductor and provided with means for permitting the trolley to pass hangers, forks, guys or obstructions on or connected to the trolley-wire or conductor, said means comprising a plurality of movable or yielding contacting devices part connected to the trolley-frame on the right and part on the left of the trolley-wire or conductor in a plane other than the plane in which the cable that moves the trolley along the trolley-wire is suspended, substantially as specified.

8. A trolley surrounding and threaded upon a trolley-wire or conductor and provided with means for permitting the trolley to pass hangers, forks, guys or obstructions on or connected to the trolley-wire or conductor, said means comprising a plurality of rotatable turnstiles, substantially as specified.

9. The combination with a trolley-frame, of a plurality of movable or yielding contacting devices thereon, having unyielding axes and arranged part on each side of the central longitudinal line of the trolley and adapted to permit the trolley to pass hangers, substantially as specified.

10. The combination with a trolley-frame, of a plurality of movable or yielding contacting devices thereon, arranged part on each side of the central longitudinal line of the trolley and adapted to permit the trolley to pass hangers, said contacting devices being in the form of rotary turnstiles, substantially as specified.

11. The combination with a trolley-frame, of a plurality of movable or yielding contacting devices thereon, arranged part on each side of the central longitudinal line of the trolley and being in a plane such as to support the trolley upon its wire cable against the strain of the depending cable that draws the trolley along and adapted to permit the trolley to pass hangers, substantially as specified.

12. The combination with a trolley-frame, of a plurality of movable or yielding contacting devices thereon, arranged alternately part on each side of the central longitudinal line of the trolley and all against the strain of the draft and adapted to permit the trolley to pass hangers, substantially as specified.

13. The combination with a trolley-frame, of a plurality of movable or yielding contacting devices thereon, arranged alternately part on each side of the central longitudinal line of the trolley and adapted to permit the trolley to pass hangers, said contacting devices being in the form of rotary turnstiles, substantially as specified.

14. The combination with a trolley-frame, of a plurality of upper movable or yielding contacting devices thereon, having unyielding axes arranged part on each side of the central longitudinal line of the trolley and adapted to permit the trolley to pass hangers, and a lower contacting device or wheel, substantially as specified.

15. The combination of a trolley-frame, of a plurality of upper movable or yielding contacting devices thereon having unyielding axes arranged part on each side of the central longitudinal line of the trolley and adapted to permit the trolley to pass hangers, and a lower contacting device or wheel mounted on a pivoted arm or lever, substantially as specified.

16. The combination of a trolley-frame, of a plurality of movable or yielding contacting devices thereon arranged part on each side of the central longitudinal line of the trolley and adapted to permit the trolley to pass hangers, a lower contacting device or wheel mounted on a pivoted arm or lever, and a connection between said arm or lever and the car, substantially as specified.

17. The combination with a trolley-frame of a plurality of rotary turnstile contacting devices thereon having unyielding axes, substantially as specified.

18. The combination with a trolley-frame of a plurality of upper rotary turnstile contacting devices thereon, and a pair of lower contacting devices or wheels mounted on pivoted arms connected to the car, substantially as specified.

19. The combination with a trolley-frame of a plurality of upper rotary turnstile contacting devices thereon, and a pair of lower contacting devices or wheels mounted on pivoted arms connected to the car, said turnstiles being arranged alternately, substantially as specified.

20. The combination with a trolley adapted to swing or tilt laterally on the trolley-wire as a pivot, of curved guides or shoes to aid in tilting the trolley, substantially as specified.

21. The combination with a laterally swinging or turning trolley of a track for the car, and a trolley-wire or conductor having portions eccentric or divergent from the track to give a side pull to the trolley to turn it to one side, substantially as specified.

22. The combination with a laterally swinging or turning trolley of a track for the car, and a trolley-wire or conductor having portions eccentric or divergent from the track to give a side pull to the trolley to turn it to one side, and a flexible conductor between the trolley and car, substantially as specified.

23. The combination with a trolley-frame, of a plurality of upper rotary turnstile contacting devices thereon and curved guides or shoes, substantially as specified.

24. The combination with a trolley-frame of a plurality of upper rotary turnstile contacting devices thereon, a pair of lower contacting devices or wheels mounted on pivoted arms connected to the car, and curved guides or shoes on the trolley, substantially as specified.

25. The combination with a trolley-wire or conductor and vertical hangers therefor having hooks and sheet-metal holders through which the hooks extend and embracing the wire, of a trolley traveling on and supported by said wire, and provided with a plurality of movable or yielding contacting devices to pass said hangers, substantially as specified.

26. The combination with a track of a trolley-wire or conductor having a fork or branch, of a trolley adapted to turn or swing laterally on said wire or conductor as a pivot, and provided with means for passing said fork or branch when swung to one side, said wire or conductor having a portion eccentric to said track to turn the trolley to one side, substantially as specified.

27. The combination with a car-track having a curve, of a trolley-wire having at such curve horizontally-extending guys, and a trolley adapted to turn laterally on said wire, a draft-cable for pulling and turning the trolley and provided with movable contacting devices for passing said guys, substantially as specified.

28. The combination with a car-track having a curve, of a trolley-wire having at such curve horizontally-extending guys, and a trolley adapted to turn laterally on said wire, and provided with movable contacting devices for passing said guys, and curved guides or shoes to aid in turning the trolley, substantially as specified.

29. The combination with a trolley-frame having parallel sides with open space between them and a central connection, of a pair of lower contacting devices or wheels having pivoted arms oscillating between said sides, and a plurality of upper turnstile contacting devices turning on vertical shafts or pivots on said frame, substantially as specified.

30. The combination with a trolley-frame having parallel sides with open space between them and a central connection, of a pair of lower contacting devices or wheels having pivoted arms oscillating between said sides, and a plurality of upper turnstile contacting devices turning on vertical shafts or pivots on said frame, part on one side thereof and part on the other, substantially as specified.

31. The combination with a trolley-frame having parallel sides with open space between them and a central connection, of a pair of lower contacting devices or wheels having pivoted arms oscillating between said sides, and a plurality of upper turnstile contacting devices turning on vertical shafts or pivots on said frame, part on one side thereof and part on the other, said turnstile contacting devices having wings or vanes with curved or inclined lower edges, substantially as specified.

32. A trolley having a plurality of turnstile-like contacting devices turning on vertical shafts or pivots, substantially as specified.

33. A trolley having a plurality of turnstile-like contacting devices turning on vertical shafts or pivots, and each having wings or vanes with curved or inclined lower edges, substantially as specified.

34. A trolley having a plurality of turnstile-like contacting devices turning on vertical shafts or pivots, and part arranged on each side of the longitudinal center of the trolley, substantially as specified.

35. A trolley having a plurality of turnstile-like contacting devices turning on vertical shafts or pivots, and part arranged on each side of the longitudinal center of the trolley, and guides on the trolley, substantially as specified.

36. A trolley having a plurality of turnstile-like contacting devices turning on vertical shafts or pivots, and part arranged on each side of the longitudinal center of the trolley, and guides on the trolley, said guides being curved both downwardly and outwardly at their ends, substantially as specified.

37. The combination with a wire or cable of a plurality of turnstiles mounted on fixed axes, part of said turnstiles being placed on one side and part on the other side of the wire or cable, so that the turnstile device and the cable are movable one along the other and supported one by the other, substantially as specified.

38. The combination with a trolley-frame, of a pair of lower contacting devices or wheels journaled on arms pivoted to said frame, and a flexible connection from the car having branches extending to and connected with said pivoted arms to force said wheels against the trolley-wire by the tension of the flexible connection in pulling the trolley, substantially as specified.

39. The combination with a trolley-frame, of a pair of lower contacting devices or wheels journaled on arms pivoted to said frame, and a flexible connection from the car having branches extending to and connected with said pivoted arms to force said wheels against the trolley-wire by the tension of the flexible connection in pulling the trolley, and a plurality of turnstile-like contacting devices turning on vertical shafts on said frame and resting upon the trolley-wire, substantially as specified.

40. The combination with a trolley-frame, of a pair of lower contacting devices or wheels journaled on arms pivoted to said frame, and a flexible connection from the car having branches extending to and connected with said pivoted arms to force said wheels against the trolley-wire by the tension of the flexible connection in pulling the trolley, a plurality of turnstile-like contacting devices turning on vertical shafts on said frame and resting upon the trolley-wire, and curved guides or shoes flush with the upper ends of said turnstile-shafts, substantially as specified.

41. The combination with the trolley-frame, of a pair of lower contacting devices or wheels journaled on arms pivoted to said frame, and a flexible connection with the car having branches extending to and connected with said pivoted arms to force said wheels against the trolley-wire by the tension of the flexible connection in pulling the trolley, a plurality of turnstile-like contacting devices turning on vertical shafts on said frame and resting upon the trolley-wire, and curved guides or shoes flush with the upper ends of said turnstile-shafts and inside said shafts, substantially as specified.

42. The combination with the trolley-frame, of a pair of lower contacting devices or wheels journaled on arms pivoted to said frame, and a flexible connection with the car having branches extending to and connected with said pivoted arms to force said wheels against the trolley-wire by the tension of the flexible connection pulling the trolley, a plurality of turnstile-like contacting devices turning on vertical shafts on said frame and resting upon the trolley-wire, and curved guides or shoes flush with the upper ends of said turnstile-shafts and inside said shafts, said turnstiles having wings or vanes with curved or inclined lower edges, substantially as specified.

43. The combination with the trolley-frame, of a pair of lower contacting devices or wheels journaled on arms pivoted to said frame, and a flexible connection with the car having branches extending to and connected with said pivoted arms to force said wheels against the trolley-wire by the tension of the flexible connection pulling the trolley, a plurality of turnstile-like contacting devices turning on vertical shafts on said frame and resting upon the trolley-wire, curved guides or shoes flush with the upper ends of said turnstile-shafts and inside said shafts, said turnstiles having wings or vanes with curved or inclined lower edges, and said guides or shoes being curved outwardly and downwardly at both ends, substantially as specified.

44. A laterally swinging or turning trolley having movable or yielding contacting devices to pass vertical hangers or supports and horizontal forks or guys connected to the trolley wire or conductor and provided with curved guides or shoes to aid in turning the trolley, substantially as specified.

45. A trolley surrounding and threaded upon a trolley-wire or conductor and provided with means for permitting the trolley to pass hangers, forks, guys or obstructions on or connected to the trolley-wire or conductor, and said trolley having curved guides or shoes to aid in turning the trolley on said wire or conductor as a pivot, substantially as specified.

46. A trolley surrounding and threaded upon a trolley-wire or conductor and provided with means for permitting the trolley to pass hangers, forks, guys or obstructions on or connected to the trolley-wire or conductor, said means comprising a plurality of rotatable turnstiles, and said trolley having curved guides or shoes to aid in turning the trolley on said wire or conductor as a pivot, substantially as specified.

47. The combination with a trolley-frame of a plurality of rotary turnstile contacting devices thereon having fixed axes and a pair of guides on the trolley-frame, substantially as specified.

48. The combination with a trolley-frame having parallel sides with open space between and a central cross connection, of a plurality of movable or yielding contacting devices having fixed axes, substantially as specified.

49. The combination with a trolley-frame having parallel sides with open space between and a central cross connection, of a plurality of rotary turnstile contacting devices journaled on the sides of said frame on upright shafts, substantially as specified.

50. The combination with a trolley-frame having parallel sides with open space between and a central cross connection, of a plurality of rotary turnstile contacting devices journaled on the sides of said frame on upright shafts, and curved guides or shoes, substantially as specified.

51. The combination with a trolley-frame having parallel sides with open space between and a central cross connection, of a plurality of movable or yielding contacting devices and an opposing lower contacting device or wheel, substantially as specified.

52. The combination with a trolley-frame having parallel sides with open space between and a central cross connection, of a plurality of movable or yielding contacting devices and an opposing lower contacting device or wheel mounted on an arm pivoted to said trolley-frame, substantially as specified.

53. The combination with a trolley-frame having parallel sides with open space between and a central cross connection, of a plurality of movable or yielding contacting devices and an opposing lower contacting device or wheel mounted on an arm pivoted to said trolley-frame, and curved guides on the trolley frame, substantially as specified.

EUGENE W. TAYLOR.

Witnesses:
E. SCHRADER,
HENRY M. HOYT.